3,824,155
MULTIPLE EFFECT EVAPORATING APPARATUS
Masaharu Takada, Osaka, Japan, assignor to Sasakura
Engineering Co., Ltd., Osaka, Japan
Filed May 12, 1972, Ser. No. 252,764
Claims priority, application Japan, May 14, 1971,
46/32,690
Int. Cl. C02b 1/06
U.S. Cl. 202—174                                                  8 Claims

ABSTRACT OF THE DISCLOSURE

A multiple effect evaporating apparatus has a plurality of vertical columns of effects, each column having an effect on the same level as each of the adjacent columns. Each effect has (1) a bundle of horizontal tubes above the bundle of tubes in the next lower effect, (2) a raw material liquid collecting means below the bundle of tubes having means therethrough for passing the collected liquid to the next lower effect, (3) a vapor inlet passage at one end of the bundle of tubes into which the tubes of the bundle open for permitting vapor to flow from the vapor inlet passage into the tubes, (4) a vapor outlet passage at the other end of the tubes into which the tubes open, and (5) a mist separator adjacent and along the bundle of tubes one side of which is in communication with the raw material liquid collecting means and the other side of which is in communication with the vapor outlet passage. The effects at the same level in the columns are positioned with the vapor inlet passages of all but one of the effects immediately adjacent and in communication with the vapor outlet passage. The effects at the level in the columns are positioned with the vapor inlet passages of all but one of the effects immediately adjacent and in communication with the vapor outlet passage of the next preceding effect in the direction of vapor flow through the effects. The vapor inlet of the one of the effects in each stage is immediately adjacent, when viewed in plane view and immediately below, when viewed in elevation, and in communication with the vapor outlet passage of the next preceding effect in the next higher level of effects in said apparatus. Means is provided for feeding steam to the vapor inlet passage of the one effect in the highest level of effects and for feeding raw material liquid to each of the bundles of each of the effects in the highest level of effects, and means is provided for collecting from the successive vapor inlet passages the condensate which condenses from the vapor therein.

---

It is conventional for a multiple effect evaporating method to employ an apparatus wherein each effect is arranged horizontally. This, however, has such disadvantages that a large floor area is required for installation of the apparatus and each effect must be provided with equipment, such as a pump, a liquid level regulator and others. In order to remove such disadvantages, it is possible to adopt the so-called vertical multiple effect evaporating method in which the stages for the different effects are placed one upon another. This method also has disadvantages in that the apparatus must be made very high, with resultant higher cost of construction, and more power is required due to the larger pumping head.

The present invention seeks to eliminate the above-mentioned disadvantages. According to the evaporating method of the present invention, an economical combination of the floor area for installation and the height of the apparatus can be selected and also a highly efficient evaporating apparatus which requires less equipment, such as pumps, and less pumping head can be constructed. The nature and advantages of the present invention will be understood more clearly from the following description made with reference to an embodiment and the accompanying drawings. However, the present invention is not limited to the following description and the accompanying drawings but its technical scope is as defined in the claims to be made hereinafter.

FIGS. 2 to 4 show respectively the arrangement of the main part of an embodiment of the present invention, in which:

FIG. 2 is a cross sectional view, taken on line II—II of FIG. 3 and FIG. 4, of a two-column effect system from which a preheater is omitted.

FIG. 3 is a longitudinal sectional view on line III—III of FIG. 2.

FIG. 4 is a longitudinal sectional view on line IV—IV of FIG. 2.

Figure 1:
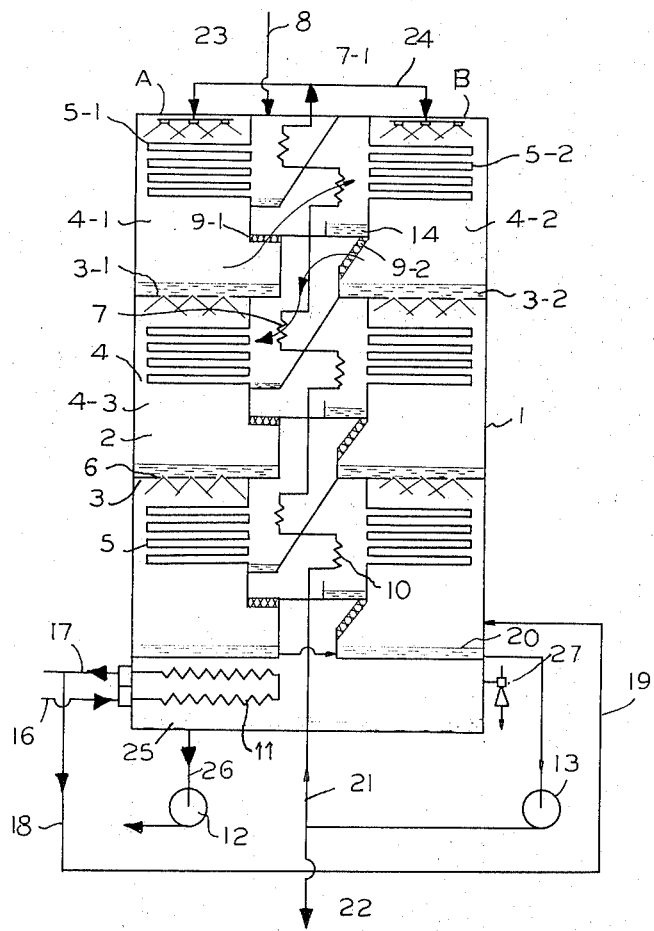
FIG. 1 is a diagram illustrating the conceptional operation of the present invention.

In the drawings, numeral 1 denotes a casing. In said casing is disposed an effect system 2 in such a fashion that a left side effect system A and a right side effect system B are arranged in two vertical columns.

Each effect system has a plurality of effects 4 which are placed one upon another with a substantially horizontal partition 3 therebetween. Pressure and temperature in each effect throughout both systems are maintained at successively lower degrees in one order from the upper one to the lower one so that the uppermost effect 4–1 of the effect system A is kept at the highest pressure and at the highest temperature, followed by the uppermost effect 4–2 of the effect system B, the second stage effect 4–3 of the effect system A, and so on.

Each effect 4 is provided with heat transfer tubes 5 which are arranged horizontally as an embodiment. In order to make brine flow down uniformly and regularly onto the outer surfaces of said heat transfer tubes 5, many jet holes 6 are made in the afore-mentioned partition 3. For carrying out the flowing down of brine, the afore-mentioned jet holes may be replaced by any other suitable spreading means. Each effect 4 is provided with a vapor passage 7 whereby an effect is placed in communication with another effect in such a fashion that vapor generated in an effect is introduced into the heat transfer tubes of the next effect which is kept at a successively lower pressure and belongs to another effect system. As shown in FIGS. 2, 3, 6 and 7, the vapor passage 7 may be disposed in the longitudinal direction of the horizontal heat transfer tubes 5. Numeral 8 denotes a heating steam piping. Numeral 9 denotes mist-separators disposed at the intermediate position between two effects, one belonging to the effect system A and the other to the effect system B. Numeral 10 denotes preheaters. Numeral 11 denotes a condenser disposed at the lowermost stage of the casing 1. Numeral 12 denotes a distilled water pump. Numeral 13 denotes a brine circulating pump. Numeral 14 denotes distilled water wells communicating with the inside of the heat transfer tubes 5. Numeral 15 denotes small holes in the bottom plates of the distilled water wells 14. Numeral 27 denotes a vacuum device.

The operation of the multiple effect evaporating apparatus having the above-mentioned construction is as follows:

Sea-water introduced from a piping 16, passing through the condenser 11, cools and condenses the vapor produced in the last effect and then is discharged from an exhaust pipe 17. The exhaust pipe 17 is provided with a branch pipe 18, through which a portion of the sea-water to be exhausted is sent as feed water, via a piping 19, into a brine well 20 of the last effect at the lowest pressure and the lowest temperature for mixing with brine. The brine thus mixed with the sea-water is pumped from the brine well 20 by a circulating pump 13, a portion of which is supplied to the preheaters 10 via a piping 21 and the remainder is exhausted out of the system via an exhaust pipe 22. Where necessary, injection of scale inhibitor, de-aeration, etc. will be carried out as in the case of a conventional sea-water evaporating method. It is also possible to make only fresh sea-water flow through the preheater as circulating brine, without mixing it with concentrated brine.

The circulating brine is preheated as it passes through the preheaters 10 and is branched into two different directions, one of which is led to the left side effect system A via a piping 23.

While the brine is made to flow down as distributed stream onto the outer surfaces of the heat transfer tubes 5-1 of the first effect 4-1 having the highest pressure and the highest temperature so as to form a brine film on the outer surfaces of the tubes, heating steam introduced into the heat transfer tubes 5-1 through the heating steam piping 8 condenses in the tubes. Brine which has accumulated on a partition 3-1 passes through jet holes 6 and then flows down throughout the effect system A successively.

Brine which was led in another direction reaches the right side effect system B by way of a branch pipe 24 and forms a brine film on the outer surfaces of the heat transfer tubes 5-2 of the effect 4-2 the pressure and temperature of which are next to those of the effect 4-1 of the afore-mentioned system A. Vapor produced in the effect 4-1 of system A is introduced into the heat transfer tubes 5-2 of the effect 4-2 via a mist-separator 9-1 and a vapor passage 7-1 so as to heat and evaporate the brine. The vapor itself condenses in the tubes. Unevaporated brine which has accumulated on the partition 3-2 passes through jet holes 6 and thereafter flows down throughout the effects in effect system B in the same manner.

Vapor produced in the effect 4-2 is introduced into the heat transfer tubes 5-3 of the effect 4-3 belonging to system A, via the mist-separator 9-2 and the vapor passage 7-2, so as to evaporate brine which is outside the tube, and the vapor itself condenses. Thereafter, vapor produced in each effect of each system is introduced into heat transfer tubes of an effect under a successively lower pressure and a successively lower temperature belonging to a different system. The operation of this nature is repeated toward the last or lowermost effect.

Distilled water accumulated in the distilled water well 14-1 of the effect 4-1 belonging to system A, is flashed through small holes 15 into the distilled water well 14-3 immediately below and the resultant flash-off vapor is combined with the afore-mentioned vapor which was produced in the effect 4-2 belonging to system B and passed the vapor passage 7-2, enters into heat transfer tubes 5-3, to be utilized as a part of heating source for brine, and condensing itself accumulates in the distilled water well 14-3.

Similarly, distilled water condensed in heat transfer tubes 5-2 of the effect 4-2 belonging to system B, accumulates in the distilled water well 14-2, is flashed into the lower stage through small holes, is combined with the vapor to be introduced from the effect 4-3 belonging to system A, enters into the heat transfer tubes 5-4, and then heats and evaporates brine and condenses itself.

The afore-mentioned distilled water was flowed down to the lower stage immediately below in the respective effect systems A and B separately, in other words, it flows down while skipping one effect with respect to the pressure and the temperature, but it is possible to improve heat recovery still further by introducing distilled water gradually into effects at successively lower pressure and temperature, throughout all unit systems.

Thus, distilled water repeats flash evaporation and condensation and is finally flashed into the distilled water chamber 25 of the lowermost stage. The flashed-off vapor in this chamber is combined with the vapor generated from brine in the last effect and then condensed by the condenser 11 which is supplied with the afore-mentioned feed water. Resultant condensate accumulates in the distilled water chamber 25 and then is withdrawn by a distilled water pump 12 through a piping 26.

Figure 2:
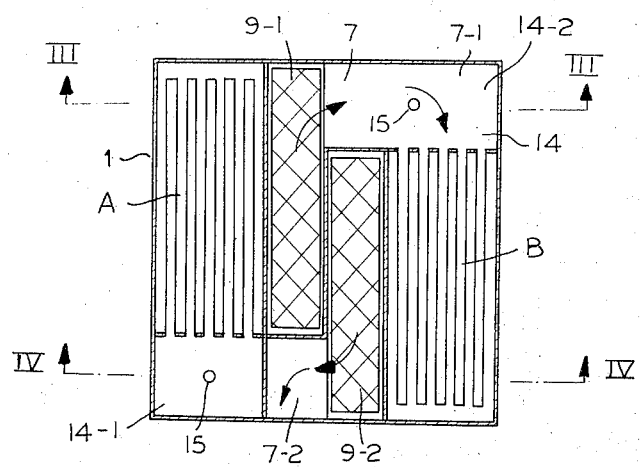
Figure 3:
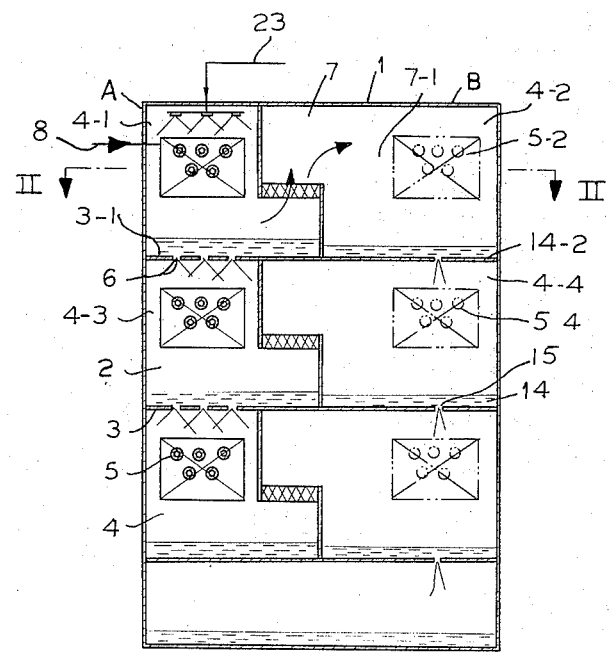
Figure 4:
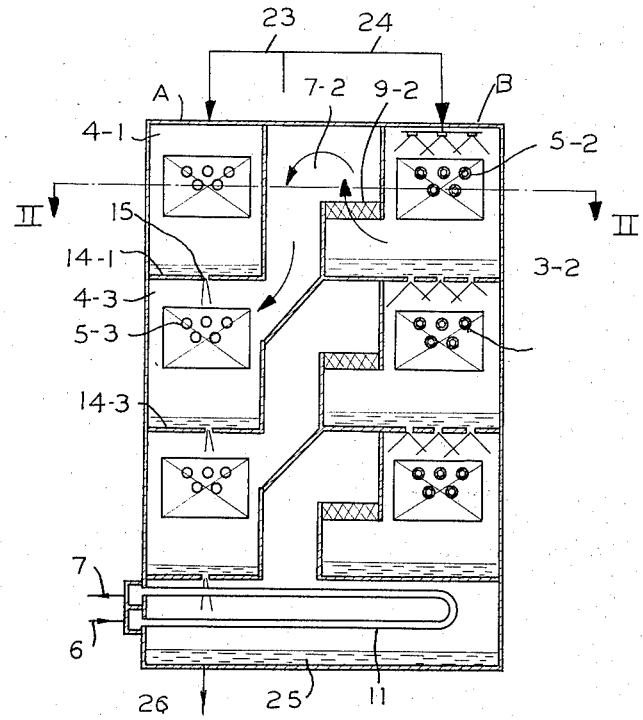
Figure 5:
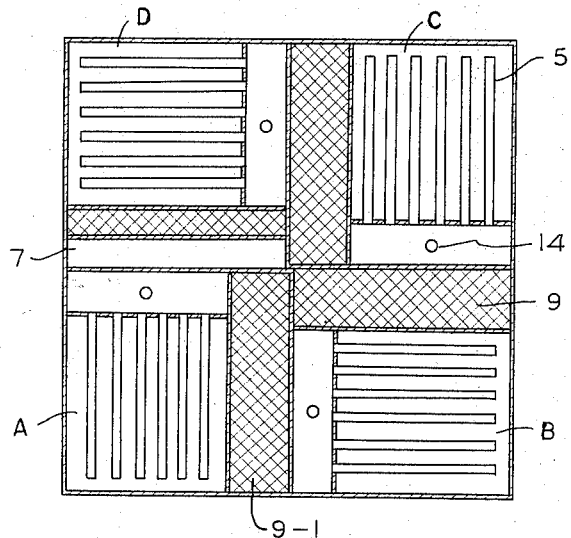
FIG. 5 is a sectional plan view of another embodiment of the present invention.
Figure 7:
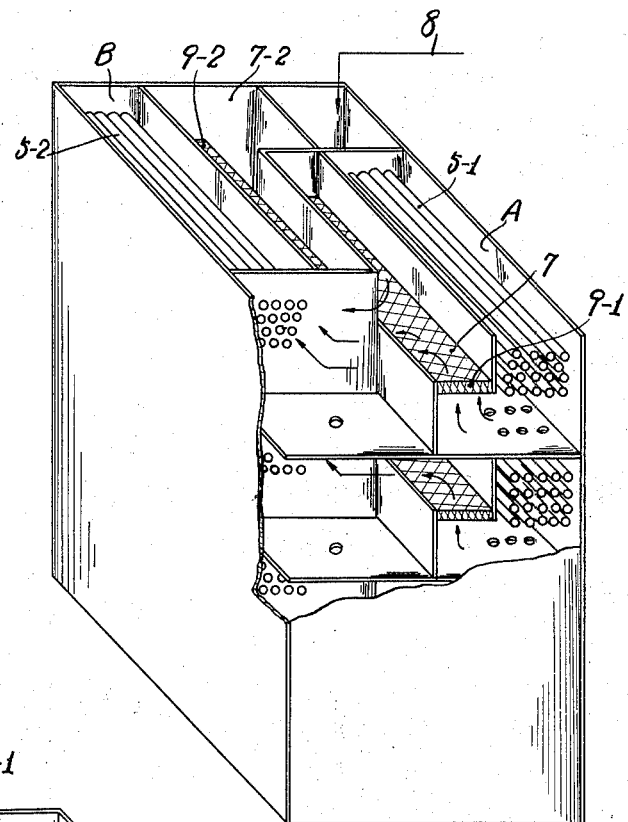
FIGS. 6 and 7 are perspective views from opposite ends of the two columns of effects shown in FIGS. 2–4.
Figure 6:
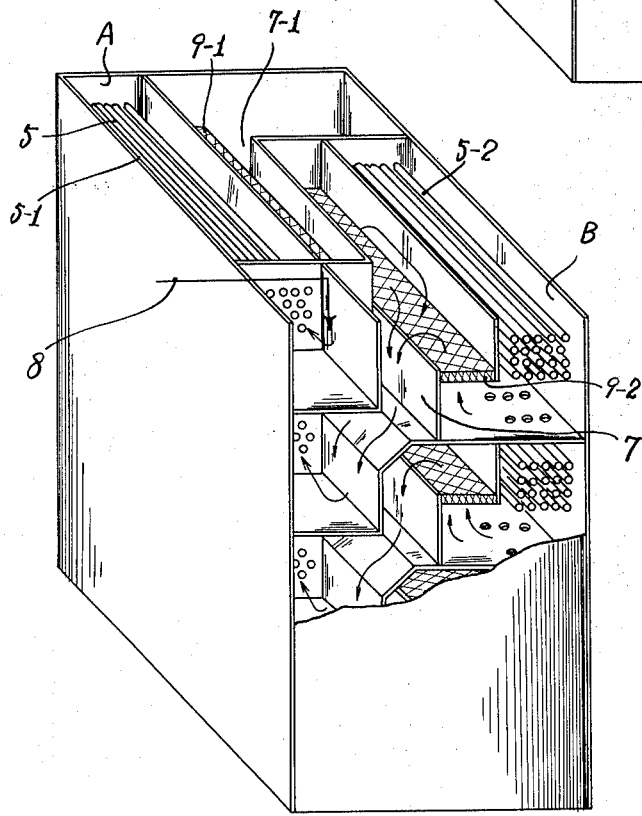

The above description has been given of an example of an embodiment of the present invention having a two-row effect system. However, arrangements of heat transfer tubes, mist-separators and vapor passages in a level or plane are not always limited to that which is shown in FIG. 2, but also may be replaced by other various means. Such flexibility in arrangement in a level or plane is greater in designs having a multiplicity of effect system rows and heat transfer tube bundles of each effect in a level or plane may be arranged parallelly, triangularly, rectangularly, radially or in zigzag directions and so on. As an example, a rectangular arrangement having four columns of effects A, B, C and D is shown in FIG. 5.

In the multiple effect evaporating method, it is necessary to increase the number of effects to increase the performance ratio (ratio of fresh water produced to the steam quantity consumed) which is most important for the economy of apparatus. In the known construction for this purpose, however, while the method of arranging effects in a horizontal direction requires a large floor area for installation, the method of placing effects one upon another involves an excessive height of the apparatus.

According to the present invention, the height of the apparatus can be made less by adopting the plural vertical columns of effects, namely, as compared with the conventional vertical effect type, the height of the apparatus can be reduced to almost half in the case of a two-column system and to almost one-fourth in the case of a four-column system. Therefore, this invention makes it possible to install an evaporating apparatus having a larger number of effects and a higher performance ratio in a relatively small floor area and with a relatively lower height.

Moreover, because the number of effect systems can be selected as desired, it is possible to select an optimum combination of the floor area for installation and the height of the apparatus, depending on the conditions of the place for the installation.

Furthermore, the arrangement as shown in FIG. 2, in which heat transfer tube bundles of the effects in a level or plane are arranged parallelly and steam or vapor is introduced into said bundles in reverse directions from effect to effect, makes it possible to decrease the length of the vapor passages and the number of turns of vapor between effects. Thus, flow resistance or pressure loss of vapor is minimized and thermal efficiency of the plant is improved. In a plural effect system according to the present invention, the merits similar to the above can also be realized more effectively for tube bundle arrangements such as rectangular, polygonal, zigzag or radial directions.

What is claimed is:

1. A multiple effect evaporating apparatus comprising a plurality of vertical columns of effects, each column having an effect on the same level as each of the adjacent columns, each effect having (1) a bundle of horizontal tubes above the bundle of tubes in the next lower effect, (2) a raw material liquid collecting means below said bundle of tubes having means therethrough for passing the collected liquid to the next lower effect, (3) a vapor inlet passage at one end of the bundle of tubes into which the tubes of the bundle open for permitting vapor to flow from the vapor inlet passage into the tubes, (4) a vapor outlet passage at the other end of the tubes into which the tubes open, and (5) a mist separator adjacent and along the bundle of tubes one side of which is in communication with the raw material liquid collecting means and the other side of which is in communication with the vapor outlet passage, the effects at the same level in the columns being positioned with the vapor inlet passages of all but one of the effects immediately adjacent and in communication with the vapor outlet passage of the next preceding effect in the direction of vapor flow through the effects, and the vapor inlet of the one of the effects in each stage immediately adjacent, when view in plane view and immediately below, when viewed in elevation, and in communication with the vapor outlet passage of the next preceding effect in the next higher level of effects in said apparatus, means for feeding steam to the vapor inlet passage of the one effect in the highest level of effects and for feeding raw material liquid to each of the bundles of each of the effects in the highest level of effects, and means for collecting from the successive vapor inlet passages the condensate which condenses from the vapor therein.

2. An apparatus as claimed in claim 1 in which said means in said raw material liquid collecting means comprises apertures.

3. An apparatus as claimed in claim 1 in which each vapor inlet passage in each effect has a distilled condensate well in the bottom thereof for collecting condensate condensing from the vapor, and said means for collecting the condensate comprising an aperture in each well for flashing the condensate into the condensate well in the next lower effect.

4. An apparatus as claimed in claim 1 further comprising a vacuum means coupled to one of the effects on the lowest level for exhausting non-condensable gas.

5. An apparatus as claimed in claim 1 further comprising means coupled between the effects on the lowest level and the effects on the highest level for recirculating the raw material liquid.

6. An apparatus as claimed in claim 1 further comprising a preheater in each level of effects, and means connecting said preheaters to said means for feeding the raw material liquid to the highest level of effects, whereby the raw material liquid is preheated.

7. An apparatus as claimed in claim 1 in which there are two columns of effects, and the vapor inlet passage in one effect on each level is adjacent and connected to the vapor outlet passage of the other effect and the vapor outlet passage of the one effect is adjacent the vapor inlet passage of the other effect and is connected to the vapor inlet passage of the effect on the next lower level which is beneath said other effect.

8. An apparatus as claimed in claim 1 in which there are four columns of effects arranged substantially in a square with the vapor inlet passage for the first effect on each level connected to the vapor outlet passage of the fourth effect on the next higher level and the vapor outlet passage of the fourth effect connected to the vapor inlet passage of the first effect on the next lower level, the vapor from each effect being able to flow into the bundle of tubes in the next effect without having to change the direction of flow in the horizontal direction.

References Cited

UNITED STATES PATENTS

| | | | |
|---|---|---|---|
| 3,303,106 | 2/1967 | Standiford | 202—174 |
| 3,499,827 | 3/1970 | Cox | 202—173 |
| 3,503,853 | 3/1970 | Taubert et al. | 202—173 |
| 3,551,298 | 12/1970 | Lichtenstein | 202—173 |
| 3,395,084 | 7/1968 | Loebel et al. | 202—173 |

NORMAN YUDKOFF, Primary Examiner

D. SANDERS, Assistant Examiner

U.S. Cl. X.R.

202—197; 203—11